United States Patent
Levy et al.

(10) Patent No.: US 12,294,636 B2
(45) Date of Patent: *May 6, 2025

(54) EFFICIENT MEMORY UTILIZATION FOR CARTESIAN PRODUCTS OF RULES

(71) Applicant: MELLANOX TECHNOLOGIES, LTD., Yokneam (IL)

(72) Inventors: Gil Levy, Hod Hasharon (IL); Aviv Kfir, Nili (IL)

(73) Assignee: Mellanox Technologies, Ltd, Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,613

(22) Filed: Feb. 26, 2024

(65) Prior Publication Data
US 2024/0195892 A1 Jun. 13, 2024

Related U.S. Application Data

(63) Continuation of application No. 17/679,160, filed on Feb. 24, 2022, now Pat. No. 11,968,285.

(51) Int. Cl.
*H04L 69/22* (2022.01)
*H04L 45/74* (2022.01)
*H04L 45/745* (2022.01)

(52) U.S. Cl.
CPC ............ *H04L 69/22* (2013.01); *H04L 45/742* (2013.01); *H04L 45/74591* (2022.05)

(58) Field of Classification Search
CPC . H04L 69/22; H04L 45/742; H04L 45/74591; H04L 45/745; H04L 45/74;

(Continued)

(56) References Cited

U.S. PATENT DOCUMENTS

| | | |
|---|---|---|
| 5,537,514 A | 7/1996 | Nishidai |
| 6,611,875 B1 | 8/2003 | Chopra et al. |

(Continued)

OTHER PUBLICATIONS

Taylor etal, "Scalable Packet Classification using Distributed Crossproducting of Field Labels" IEEE INFOCOM, pp. 71-12, 2005 (Year: 2005).*

(Continued)

*Primary Examiner* — Thinh D Tran
(74) *Attorney, Agent, or Firm* — Meitar Patents Ltd.; Daniel Kligler (57) ABSTRACT

A network device includes one or more ports, and action-select circuitry. The ports are to exchange packets over a network. The action-select circuitry is to determine, for a given packet, a first search key based on a first header field of the given packet, and a second search key based on a second header field of the given packet, to compare the first search key to a first group of compare values, to output a multi-element vector responsively to a match between the first search key and a first compare value, to generate a composite search key by concatenating the second search key and the multi-element vector, to compare the composite search key to a second group of compare values, and, responsively to a match between the composite search key and a second compare value, to output an action indicator for applying to the given packet.

11 Claims, 7 Drawing Sheets

(58) Field of Classification Search
CPC . H04L 45/7453; H04L 49/30; H04L 49/3009; H03M 7/3082
See application file for complete search history.

(56) References Cited

U.S. PATENT DOCUMENTS

| | | | |
|---|---|---|---|
| 6,957,215 | B2 | 10/2005 | Stark |
| 7,051,078 | B1 | 5/2006 | Cheriton |
| 7,054,315 | B2 | 5/2006 | Liao |
| 7,061,874 | B2 | 6/2006 | Merugu et al. |
| 7,116,663 | B2 | 10/2006 | Liao |
| 7,234,019 | B1 | 6/2007 | Kao et al. |
| 7,366,830 | B1 | 4/2008 | Maheshwari |
| 7,394,809 | B2 | 7/2008 | Kumar et al. |
| 7,426,518 | B2 | 9/2008 | Venkatachary et al. |
| 7,804,699 | B2 | 9/2010 | Gupta et al. |
| 7,904,642 | B1 | 3/2011 | Gupta et al. |
| 7,933,282 | B1 | 4/2011 | Gupta et al. |
| 8,271,564 | B2 | 9/2012 | Dade et al. |
| 8,290,934 | B2 | 10/2012 | Stergiou et al. |
| 8,305,271 | B2 | 11/2012 | Li et al. |
| 8,462,786 | B2* | 6/2013 | Liu .................. H04L 45/7453 726/13 |
| 8,468,296 | B1 | 6/2013 | Cohen |
| 8,619,766 | B2 | 12/2013 | Wang et al. |
| 8,856,203 | B1 | 10/2014 | Schelp et al. |
| 8,861,347 | B2 | 10/2014 | Bloch et al. |
| 8,874,842 | B1 | 10/2014 | Kimmel et al. |
| 8,938,469 | B1 | 1/2015 | Keen et al. |
| 9,087,586 | B2 | 7/2015 | Bosshart |
| 9,098,601 | B2 | 8/2015 | Wang |
| 9,111,615 | B1 | 8/2015 | Jiang |
| 9,171,030 | B1 | 10/2015 | Arad et al. |
| 9,223,711 | B2 | 12/2015 | Philip et al. |
| 9,245,626 | B2 | 1/2016 | Fingerhut et al. |
| 9,262,312 | B1 | 2/2016 | Gazit et al. |
| 9,270,592 | B1 | 2/2016 | Sites |
| 9,317,517 | B2 | 4/2016 | Attaluri et al. |
| 9,344,366 | B2 | 5/2016 | Bouchard et al. |
| 9,406,381 | B2 | 8/2016 | Akerib et al. |
| 9,411,908 | B2 | 8/2016 | Valency et al. |
| 9,424,366 | B1 | 8/2016 | Gazit et al. |
| 9,438,505 | B1 | 9/2016 | Zhou et al. |
| 9,461,931 | B1 | 10/2016 | Asveren |
| 9,543,015 | B1 | 1/2017 | Roy |
| 9,569,561 | B2 | 2/2017 | Wildman et al. |
| 9,627,063 | B2 | 4/2017 | Dharmapurikar |
| 9,659,046 | B2 | 5/2017 | Sen et al. |
| 9,672,239 | B1 | 6/2017 | Rottenstreich et al. |
| 9,704,574 | B1 | 7/2017 | Shamis |
| 9,779,123 | B2 | 10/2017 | Sen et al. |
| 9,785,666 | B2 | 10/2017 | Li et al. |
| 9,866,479 | B2 | 1/2018 | Wang et al. |
| 9,892,057 | B2 | 2/2018 | Levy et al. |
| 9,984,144 | B2 | 5/2018 | Levy et al. |
| 10,049,126 | B2 | 8/2018 | Levy et al. |
| 10,068,034 | B2 | 9/2018 | Levy et al. |
| 10,097,378 | B2 | 10/2018 | Dong et al. |
| 10,313,231 | B1 | 6/2019 | Bosshart |
| 10,944,675 | B1 | 3/2021 | Remen et al. |
| 11,108,728 | B1 | 8/2021 | Boutros et al. |
| 11,588,821 | B1 | 2/2023 | Detwiler et al. |
| 11,917,042 | B2 | 2/2024 | Levy et al. |
| 11,929,837 | B2 | 3/2024 | Levy et al. |
| 11,968,285 | B2 | 4/2024 | Levy et al. |
| 2001/0021189 | A1* | 9/2001 | Shiota .................. H04L 45/00 370/389 |
| 2002/0023080 | A1 | 2/2002 | Uga et al. |
| 2002/0089937 | A1 | 7/2002 | Venkatachary et al. |
| 2002/0154636 | A1 | 10/2002 | Thomas |
| 2003/0051165 | A1 | 3/2003 | Krishnan et al. |
| 2003/0123459 | A1 | 7/2003 | Liao |
| 2004/0100950 | A1 | 5/2004 | Basu et al. |
| 2005/0147113 | A1 | 7/2005 | Brown |
| 2006/0209725 | A1 | 9/2006 | Cadambi et al. |
| 2006/0271539 | A1 | 11/2006 | Loeb |
| 2007/0050602 | A1* | 3/2007 | Lien .................. G06F 9/3836 712/217 |
| 2008/0192754 | A1 | 8/2008 | Ku et al. |
| 2008/0215518 | A1 | 9/2008 | Matsuda |
| 2008/0228691 | A1 | 9/2008 | Shavit et al. |
| 2008/0259667 | A1 | 10/2008 | Wickeraad |
| 2009/0097654 | A1 | 4/2009 | Blake |
| 2010/0036820 | A1 | 2/2010 | Stergiou et al. |
| 2010/0080223 | A1 | 4/2010 | Wong et al. |
| 2010/0269024 | A1 | 10/2010 | Hao et al. |
| 2012/0054467 | A1 | 3/2012 | Fulton et al. |
| 2012/0137060 | A1 | 5/2012 | Akerib et al. |
| 2012/0275466 | A1 | 11/2012 | Bhadra et al. |
| 2013/0311492 | A1 | 11/2013 | Calvignac et al. |
| 2014/0006706 | A1 | 1/2014 | Wang |
| 2014/0089498 | A1 | 3/2014 | Goldfarb et al. |
| 2014/0201307 | A1 | 7/2014 | Banavalikar et al. |
| 2014/0215144 | A1 | 7/2014 | Valency et al. |
| 2014/0310307 | A1 | 10/2014 | Levy et al. |
| 2015/0039823 | A1* | 2/2015 | Chen ................ G06F 16/90339 711/108 |
| 2015/0058595 | A1 | 2/2015 | Gura et al. |
| 2015/0117450 | A1 | 4/2015 | Thibaut |
| 2015/0127900 | A1 | 5/2015 | Dharmapurikar et al. |
| 2015/0207735 | A1 | 7/2015 | Kuramoto |
| 2015/0242429 | A1 | 8/2015 | Varvello et al. |
| 2015/0244842 | A1 | 8/2015 | Laufer et al. |
| 2016/0202932 | A1 | 7/2016 | Kadu |
| 2016/0294625 | A1 | 10/2016 | Mahkonen et al. |
| 2016/0315880 | A1 | 10/2016 | Guo et al. |
| 2016/0350358 | A1 | 12/2016 | Patel et al. |
| 2017/0046395 | A1 | 2/2017 | Li et al. |
| 2017/0053012 | A1 | 2/2017 | Levy et al. |
| 2017/0147254 | A1 | 5/2017 | Adams et al. |
| 2017/0195253 | A1 | 7/2017 | Annaluru et al. |
| 2017/0286292 | A1 | 10/2017 | Levy et al. |
| 2017/0324663 | A1 | 11/2017 | Menase |
| 2017/0346765 | A1 | 11/2017 | Immidi |
| 2018/0011852 | A1 | 1/2018 | Bennett et al. |
| 2018/0262599 | A1 | 9/2018 | Firestone |
| 2018/0278525 | A1 | 9/2018 | Levy et al. |
| 2018/0330412 | A1 | 11/2018 | Fredriksson et al. |
| 2019/0036821 | A1 | 1/2019 | Levy et al. |
| 2019/0042304 | A1 | 2/2019 | Wang et al. |
| 2019/0149516 | A1 | 5/2019 | Rajahalme et al. |
| 2019/0340028 | A1 | 11/2019 | Fujiwara |
| 2020/0042629 | A1 | 2/2020 | Levy et al. |
| 2020/0089816 | A1 | 3/2020 | Shattah |
| 2020/0228449 | A1 | 7/2020 | Shmilovici |
| 2021/0297151 | A1 | 9/2021 | Levi et al. |
| 2021/0344596 | A1 | 11/2021 | Mittelman |
| 2022/0075766 | A1 | 3/2022 | Levy et al. |

OTHER PUBLICATIONS

Che etal, "DRES: Dynamic Range Encoding Scheme for TCAM Coprosessers") IEEE Transactions on Computers, vol. 57, No. 7, pp. 902-915, Jul. 2008 (Year: 2008).*

Meiners et al., "Algorithmic Approaches to Redesigning TCAM-Based Systems", Proceedings of the 2008 ACM SIGMETRICS international conference on Measurement and modeling of computer systems (SIGMETRICS 08), pp. 467-466, Jun. 2-6, 2008 ( Year: 2008).*

Hua et al., "Variable-Stride Multi-Pattern Matching for Scalable Deep Packet Inspection", IEEE INFOCOM , pp. 415-423, Rio de Janeiro, Brazil, Apr. 19-25, 2009.

Che et al., "DRES: Dynamic Range Encoding Scheme for TCAM Coprocessors", IEEE Transactions on Computers, vol. 57, No. 7, pp. 902-915, Jul. 2008.

Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.

Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.

(56) References Cited

OTHER PUBLICATIONS

Liu et al., "Complete Redundancy Removal for Packet Classifiers in TCAMs", IEEE Transactions on Parallel and Distributed Systems, vol. 21, No. 4, pp. 424-437, Apr. 2010.

Taylor et al., "Scalable Packet Classification using Distributed Crossproducting of Field Labels", IEEE INFOCOM, pp. 1-12, 2005.

Kogan et al., "Strategies for Mitigating TCAM Space Bottlenecks," IEEE 22nd Annual Symposium on High-Performance Interconnects, IEEE Computer Society, pp. 25-32, year 2014.

Xu et al., "A Novel Hash-based Packet Classification Algorithm," 5th International Conference on Information Communications & Signal Processing, pp. 1504-1508, Dec. 2005.

Pontarelli et al., "Parallel d-Pipeline: A Cuckoo Hashing Implementation for Increased Throughput", IEEE Transactions on Computers, vol. 65, No. 1, pp. 326-331, Jan. 2016.

Reviriego et al., "Energy Efficient Exact Matching for Flow Identification with Cuckoo Affinity Hashing", IEEE Communications Letters, vol. 18, No. 5, pp. 885-888, May 2014.

Pontarelli et al., "Cuckoo Cache: A Technique to Improve Flow Monitoring Throughput", IEEE Internet Computing, vol. 20, issue 4, pp. 1-11, Jul.-Aug. 2016.

Zhou et al., "Scalable, High Performance Ethernet Forwarding with CUCKOOSWITCH", CoNEXT '13, pp. 1-12, Santa Barbara, USA, Dec. 9-12, 2013.

Bi et al, "Hierarchical trie packet classification algorithm based on expectation-maximization clustering," research article, Plos One, pp. 1-12, Jul. 13, 2017, as downloaded from https://journals.plos.org/plosone/article?id=10.1371/journal.pone.0181049.

Baboescu et al., "Scalable Packet Classification," IEEE/ACM Transactions on Networking, vol. 13, No. 1, pp. 2-14, Feb. 2005.

Lakshminarayanan et al., "Algorithms for advanced packet classification with ternary CAMs", Proceedings of the 2005 conference on Applications, technologies, architectures, and protocols for computer communications (SIGCOMM '05), pp. 193-204, Aug. 21-26, 2005.

Pagh, R., "Cuckoo Hashing for Undergraduates", IT University of Copenhagen, pp. 1-6, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 4, pp. 1543-1561, Sep. 2009.

Patrow, A., "General Purpose Hash Function Algorithms", pp. 1-6, year 2000 http://www.partow.net/programming/hashfunctions/.

Laurence et al., "Spam Based Architecture for team for Low Area and Less Power Consumption", ARPN Journal of Engineering and Applied Sciences, vol. 10, No. 17, pp. 7607-7612, Sep. 2015.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsrube, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, pp. 1-37, May 21, 2004.

Demetriades et al., "An Efficient Hardware-basedMulti-hash Scheme for High Speed IP Lookup", 16th IEEE Symposium on High Performance Interconnects, pp. 103-110, Aug. 26-28, 2008.

Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.

Kasnavi et al., "A cache-based internet protocol address lookup architecture", Computer Networks, vol. 52, pp. 303-326, year 2008.

Matousek, et al., "ClassBench-ng: Recasting ClassBench After a Decade of Network Evolution", Proceedings of the Symposium on Architectures for Networking and Communications Systems (ANCS '17), pp. 1-13, May 2017.

Breslow et al., "Horton Tables: Fast Hash Tables for In-Memory Data-Intensive Computing," Proceedings of the 2016 USENIX Annual Technical Conference, pp. 281-294, Jun. 2016.

* cited by examiner

| DESTINATION PORT (K1) | DESTINATION IP Address (K2) | ACTION |
|---|---|---|
| 2 | 138.100.17.07 | FORWARD |
| 6 | 138.100.17.07 | FORWARD |
| 3 | 138.100.17.09 | FORWARD |
| 3 | 138.100.17.43 | FORWARD |
| 6 | 138.100.17.43 | FORWARD |
| 31 | 138.100.17.63 | FORWARD |
| ALL OTHER COMBINATIONS | | DROP |

EFFICIENT MEMORY UTILIZATION FOR CARTESIAN PRODUCTS OF RULES

CROSS-REFERENCE TO RELATED APPLICATIONS

This application is a continuation of U.S. patent application Ser. No. 17/679,160, filed Feb. 24, 2022, whose disclosure is incorporated herein by reference.

FIELD OF THE INVENTION

The present invention relates generally to communication networks, and particularly to efficient determination of communication packet actions based on the packet header.

BACKGROUND OF THE INVENTION

In communication networks, actions may be applied to communication packets, according to the contents of one or more header fields of the packet.

In "Hierarchical trie packet classification algorithm based on expectation-maximization clustering", Bi and Zaho (Jul. 13, 2017; doi.org/10.1371/journal.pone.0181049) the authors assert that packet classification algorithms which are able to deal with large-scale rule sets are in urgent need, and explain that packet classification algorithms based on hierarchical trie have become important because of their widely practical use, despite the shortcomings of the hierarchical trie such as the existence of backtracking and empty nodes. The authors next propose a new packet classification algorithm based on Expectation-Maximization Clustering (HTEMC) that not only adopts trie path compression to eliminate backtracking, but also solves the problem of low efficiency of trie updates, which greatly improves the performance of the algorithm.

In "Scalable Packet Classification", Barboescu and Varghese (IEEE/ACM Transactions on Networking, VOL. 13, NO. 1, February 2005), the authors assert that packet classification reported in the literature scale poorly in either time or space as filter databases grow in size, while hardware solutions such as TCAMs do not scale to large classifiers. The paper seeks to exploit this observation to produce a scalable packet classification scheme called Aggregated Bit Vector (ABV), which takes the bit vector search algorithm (BV) (which takes linear time) and adds two new ideas—recursive aggregation of bit maps and filter rearrangement—to an ABV that can take logarithmic time for many databases.

Lastly, techniques to increase the efficiency of TCAMs in packet classification are described, for example, in "Algorithms for Advanced Packet Classification with Ternary CAMs," Lakshminarayanan et al., ACM SIGCOMM 2005.

SUMMARY OF THE INVENTION

An embodiment of the present invention that is described herein provides a network device including one or more ports, action-select circuitry, and a packet processor. The one or more ports are to exchange packets over a network, each packet including a packet header having at least first and second header fields. The action-select circuitry is to determine, for a given packet, a first search key based on the first header field of the given packet, and a second search key based on the second header field of the given packet, to compare the first search key to a first group of compare values, to output a multi-element vector responsively to a match between the first search key and a first compare value in the first group, to generate a composite search key by concatenating the second search key and the multi-element vector, to compare the composite search key to a second group of compare values, and, responsively to a match between the composite search key and a second compare value in the second group, to output an action indicator for applying to the given packet. The packet processor is to process the packets responsively to the packet headers, including applying an action to the given packet responsively to the action indicator, which was output by the compare circuitry.

In some embodiments, the multi-element vector includes a One-Hot vector, the One-Hot vector having a marker element whose position in the One-Hot vector is indicative of an index of the first compare value, which was found to match the first search key, in the first group. In an example embodiment, the second compare value in the second group includes (i) second values that correspond to the second header field, and (ii) compare vectors, each compare vector including: a "do not care" value in one or more positions for which a combination of (i) the corresponding second value and (ii) the corresponding first compare value, warrants outputting the action indicator; and a non-set value in one or more other positions.

In some embodiments, the multi-element vector is defined such that: one or more elements of the multi-element vector, having indices corresponding to indices of second compare values in the second group that match the second search key, are set; and one or more elements of the multi-element vector, having indices corresponding to indices of second compare values in the second group that do not match the second search key, are not set. In an example embodiment, the compare values in the second group include (i) second search key values, and (ii) multi-element vector compare values in which one or more elements, in positions indicative of indices of a first search key value, are set, and elements in other positions are set to a "do not care" value.

In a disclosed embodiment, at least one of the first and second compare values includes a "do not care" value. In some embodiments, the multi-element vector includes binary elements. In an embodiment, the action-select circuitry includes a Ternary Content Addressable Memory (TCAM), to store one or both of the first and second groups of compare values.

There is additionally provided, in accordance with an embodiment that is described herein, a method in a network device. The method includes exchanging packets over a network, each packet including a packet header having at least first and second header fields. For a given packet, a first search key is determined based on the first header field of the given packet, and a second search key is determined based on the second header field of the given packet. The first search key is compared to a first group of compare values, and, responsively to a match between the first search key and a first compare value in the first group, a multi-element vector corresponding to the first compare value is output. A composite search key is generated by concatenating the first search key and the multi-element vector. The composite search key is compared to a second group of compare values, and, responsively to a match between the composite search key and a second compare value in the second group, an action indicator for applying to the given packet is output. The packets are processed responsively to the packet headers, including applying an action to the given packet responsively to the action indicator, which was output by the compare circuitry.

There is also provided, in accordance with an embodiment that is described herein, a method for determining actions to be applied to packets in a network device. The method includes, for a given packet being processed in the network device, determining a first search key based on a first header field of the given packet, and a second search key based on a second header field of the given packet. The first search key is compared to a first group of compare values, and a multi-element vector is output responsively to a match. A composite search key is generated by concatenating the first search key and the multi-element vector. The composite search key is compared to a second group of compare values, and, responsively to a match, an action indicator is output for applying to the given packet.

The present invention will be more fully understood from the following detailed description of embodiments thereof, taken together with the drawings in which:

DETAILED DESCRIPTION OF EMBODIMENTS

Overview

Network devices, such as network switches/routers and others, communicate packets over a communication network (e.g., Ethernet or InfiniBand™). A Network device typically receives packets from the network through ingress ports and forwards the packets through egress ports to the network, according to forwarding/routing rules.

The network device may comprise a packet processor, which is configured to process and route the packets, according to a set of rules that are typically based on the values stored in the packet header (in a TCP/IP example, the header comprises five header fields, including a source-address field, an ingress-port field, a protocol field, a destination address field and an egress port field; collectively known as an L4 5-tuple).

The set of rules, (which is sometimes called an Action Table) comprises one or more actions, and, for each action, the corresponding values of the header of the packet upon which the action should be applied. Sometimes, the values of the packet header fields specified for each rule comprise "do not care" fields (commonly designated by an "X" symbol); for example, if a given action should be applied to all packets that are ingress from a given port, irrespectively of the values of the other header fields, the corresponding rule will comprise the given port at the ingress-port header-field, and "do not care" for all other header fields.

Typically, some rules are defined as cartesian products of single field rules, and while the number of values for a given rule in a single field is manageable, the number of cartesian products may be extremely high and slow the packet processing and/or require a large amount of circuitry. When the rule matching is done using a Ternary Content-Addressable Memory (TCAM), the TCAM size may be very large and/or not all rules may fit in the TCAM. (TCAM has the advantage of concurrently searching for all rules, and the disadvantage of large area and high power-consumption.)

Embodiments according to the present invention that are disclosed herein provide for an apparatus and methods that efficiently locate a rule and determine an action, based on the values of the packet header. In embodiments, an Action Select Circuit (ASC) receives two or more fields of a packet header and extracts an action responsively to the contents of the header fields and to a preprogrammed set of rules.

In an embodiment, the ASC comprises a first compare circuit that compares a first packet header field to a column of compare values, and outputs a respective interim-result output vector. The ASC combines the output vector and a second field of the packet header, to generate a composite search key, which is input to a second compare circuit comprising a second column of compare values; the second compare circuit then outputs an action respective to the first and the second packet header fields.

In some embodiments, different compare values in the first compare circuit are assigned member IDs, and the interim result output vector is a One-Hot representation of the member ID. The second compare circuit compares the one-hot representation to a field in which all bit positions that correspond to an action are set to a "do not care" value, whereas other bit positions are at logic-0.

In other embodiments, the second compare circuit comprises a first search column, which includes search values of the second header field. The search values are assigned member IDs, which are represented in a one-hot format in a second search column of the second compare circuit. The one-hot representation includes a single set element in a location according to the member-ID, with all other elements set to "do not care". The ASC compares the interim output vector from the first compare circuit to the second search column, and the first search column to the second header field. When there is a match in both search fields (in the same row), the ASC indicates an action.

System Description

Network devices, such as network switches and routers, receive packets from a communication network (e.g., Ethernet or InfiniBand™) through ingress ports and forward packets, through egress ports, to the network. (In the disclosure hereinbelow we will refer mainly to switches and routers; the present invention, however, is not limited to switches and routers, and may be used in all suitable network devices, including Network Interface Controllers (NICs), Host Channel Adapters (HCAs), Network-enabled Graphic Processor Units (GPUs), Data Processing Units (DPUs—also referred to sometimes as "Smart-NIC"), and any other computing device that is coupled to a communication network.

Typically, the network device comprises packet processing circuitry that applies processing actions to ingress packets according to a set of rules that the network device sets. Some of the rules refer to contents of the packet header; for example, a rule may state that the network device will always drop ingress packets with a source-IP-port that is equal to a preset value (e.g., for security).

A packet header may comprise a plurality of header fields (e.g., five header fields, to define a source-IP-address, a source-port, a destination-IP-address, a destination port, and a protocol ID); in practice, while some header fields may be relatively small, other fields may comprise 32 bits or more, and, thus, the number of possible header combinations may be gigantic.

The set of rules sometimes associates actions with a combination of the values in a plurality of header fields, and e.g., drop packets with source IP-address=X destination port=Y, irrespectively of the contents of other header fields. Fields that are not checked by a rule are referred to as "do not care fields", and denoted by an X. In some embodiments, "do not care" values may also be used in checked field, for some of the bits therein. For example, for a source-IP-address header field, having the format NUM1.NUM2.NUM3.NUM4 (four decimal numbers, separated by dots), the following rule may be applied—"drop packets if the value of the field is 138.100.X.7". The rule will be applied for field values of 138.100.2.7, 138.100.4.7, but will not be applied to field values of 138.101.2.7 and 138.100.2.6.

In embodiments, the network device comprises an action select circuit to efficiently determine an action based on fields of the packet headers and on a preprogrammed ruleset.

Figure 1:
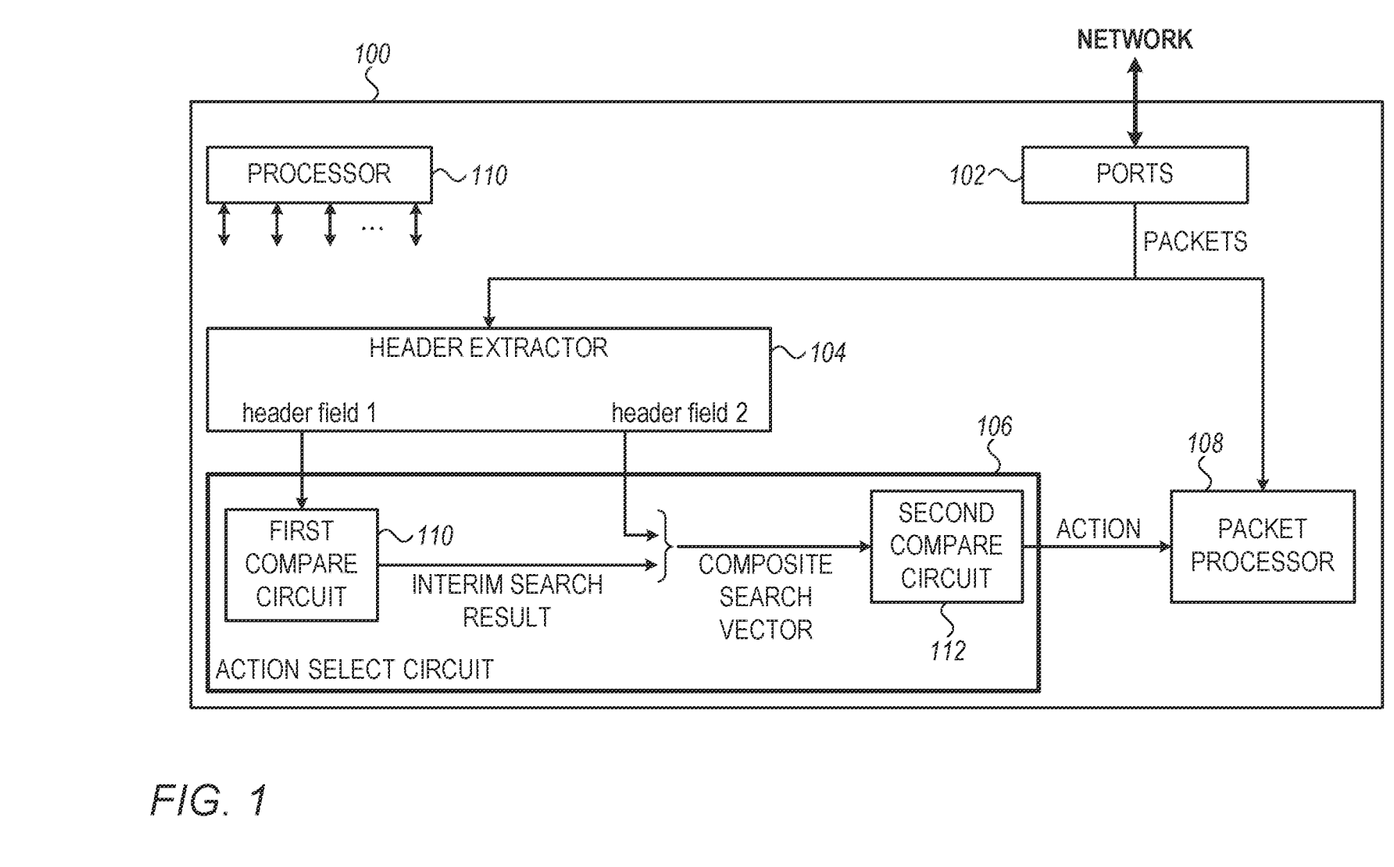
FIG. 1 is block diagram that schematically illustrates a network device, in accordance with an embodiment of the present invention.

FIG. 1 is a block diagram that schematically illustrates a network device 100, in accordance with an embodiment of the present invention. The network device comprises Ports 102 (that may include ingress and egress ports) for communicating packets through a network such as Ethernet, InfiniBand™ or any other suitable network; a Header Extractor 104, to extract header fields of the ingress packets; an Action Select Circuit (ASC) 106, which is configured to select an action to be executed on the ingress packets (e.g., Forward, or Drop); and a packet processor 108, to process the packets responsively to the indicated actions (Other components of network device 100 are not shown, for the sake of conceptual clarity).

According to the example embodiment illustrated in FIG. 1, ASC 106 comprises a First Compare Circuit 110 and a Second Compare circuit 112. The first Compare Circuit 110 compares a first header field of the packet header to a first set of search values, and, responsively, outputs an interim search result. The second Compare Circuit compares a composite search value, comprising a second header field and the interim search result, to a second set of search values, and indicates an action to the packet processor.

It should be noted that, in practice, the number of header fields is often larger than two, and other rules may be associated with other header fields. In embodiments, such additional rules may be processed by other compare circuits, including (but not limited to) interconnected pairs of Compare Circuits.

The number of header field combinations, even for just two header fields, may be very large; and, thus, a search for rules that are defined by a combination of two header fields may consume a sizable amount of silicon area (and substantial power). In embodiments, the area and power may be substantially reduced if the search is done by two separate compare circuits, wherein an interim result of a first Compare Circuit is used as input to a second Compare Circuit. In some embodiments, when one of the fields is substantially smaller, the smaller field may be represented by a vector.

In some embodiments, the first and/or the second Compare Circuits comprise one or more Ternary Content-Addressable Memory (TCAM), which are configured to compare input data to compare values that are stored therein; in an embodiment, both the first and the second Compare Circuits are in a single TCAM; the TCAM is first accessed to execute the compare functions of the first Compare Circuit, and then accessed to execute the compare functions of the second Compare Circuit; the TCAM may store the interim results in a register (e.g., external to the TCAM).

It should be noted that, although, according to the example embodiment illustrated in FIG. 1, ASC 106 selects an action to be applied to ingress packets based on the ingress packet header, ASC 106 may, in alternative embodiment, select actions to be applied to egress packets based on the headers of the egress packets. In other embodiment, the ASC may select actions to be applied on both ingress and egress packets.

In some embodiments, Network Device 100 further comprises a processor, that monitors and configures various network device circuits. In other embodiments, the processor may be external, connected to the network device through an interface (e.g., Peripheral Component Interconnect Express, or PCIe).

The configuration of network device 100 and ASC 106, illustrated in FIG. 1 and described above are cited by way of example. Other configurations may be used in alternative embodiments. For example, in embodiments, a plurality of Compare Circuit pairs may be used. In some embodiments, the action that second Compare Circuit 108 selects may be input to other circuits, which may, for example, transfer the Action to the packet processor only if some other conditions are met.

Figure 2:
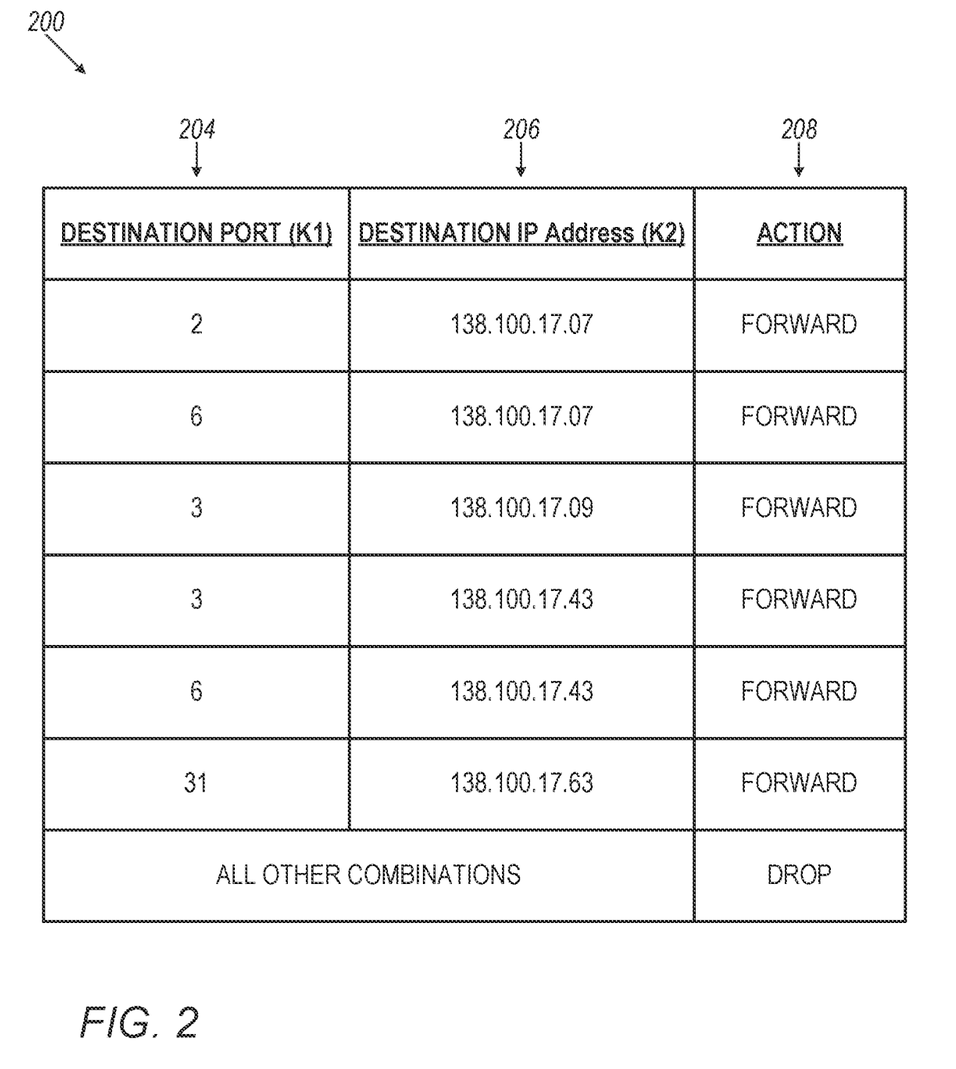
FIG. 2 is an example two-header-field ruleset table, in accordance with an embodiment of the present invention.

FIG. 2 is an example two-header-field ruleset table 200, in accordance with an embodiment of the present invention. It should be noted that typical ruleset tables are significantly larger than table 200 and may reach thousands and tens of thousands of rules. Example ruleset 200 is cited merely for conceptual clarity of the embodiments, to be disclosed hereinbelow.

Ruleset table 200 comprises a Destination-Port column 204, a Destination-IP-address column 206, and an Action column 208. Each column comprises a plurality of rows, corresponding to a plurality of rules. Rows of the Destination-Port column comprise search values pertaining to the Destination-Port header field, whereas rows of the destination-IP-address column comprise search values pertaining to the Destination-IP-address header field. If, for any given row, both the destination-IP-address search value and the destination-Port search value match the values of the respective header fields, the network device will select an action from the Actions Column 208 that corresponds to the given row.

In some embodiments, an action may have a binary value—e.g., forward (logic-1) or Drop (logic-0). In such embodiments, rows that correspond to one of the logic values may be skipped from the ruleset table, and the action that corresponds to the logic level may be selected by default. For example, in table 200, if Drop is a complementary value of Forward (that is—the action to be taken is always either Forward or Drop), the table may comprise compare rows with a Forward action only and will not include rows pertaining to Drop; For a smaller table size, the logic value having a smaller number of rules should be stored in the table, and the logic value having a larger number of rules be selected by default. (In practice, the action column, for a binary value action, may be eliminated.)

Ruleset table 200, illustrated in FIG. 2 and described herein, is an example embodiment that is cited merely for the sake of conceptual clarity. Other ruleset tables may be used in alternative embodiments, for example, having a different (typically much larger) ruleset size and pertaining to different header fields. In an embodiment, the compare values may comprise "do not care" values, that are to the value the matched irrespectively of corresponding header field bits. In yet another embodiment, the number of possible actions may be more than two.

Definitions

In the descriptions herein, we use several terms, which are defined and explained below:

Action: an operation that the packet processor applies to a given packet, typically in response to the packet header. Actions include Forward, Drop and many others.

Action Select Circuit (e.g., ASC 106, FIG. 1): a circuit which selects an Action responsively to the packet header. In embodiments, the ASC comprises two or more Compare Circuits.

Header Field: a functional portion of the packet header, e.g., Destination—IP-address, Destination-port etc. A typical header may comprise, for example, five header fields. In the descriptions hereinbelow we will sometimes refer to a "first header field" and a "second header field"; these enumerations, however, are not necessarily related to the location of the header field within the header and will be used as generic header field identifiers.

Search Key: a multi-element signal that is compared to preset compare data. In embodiments, a Search Key may comprise one or more Header Fields; in other embodiments, the Search Key is built according to a Header Field (e.g., the key may be a signature of one or more Header Fields); in an embodiment, the Search Key may be a Composite Search Key (defined below).

Compare Values: a set of preset compare data that is compared to a Search Key. For example, the set of destination port numbers {2, 6, 3, 3, 6, 31} in column 204, FIG. 2.

Compare Column: a group of Compare Values that are compared to a single Search Key. There may be more than one compare columns that are compared to more than one compare keys. For example, columns 204, 206 (FIG. 2).

Data Column: a set of data elements that are associated with the corresponding Compare Values in the one or more Compare Columns (e.g., data column 208, FIG. 2).

Compare-Row: a row of elements, comprising a single Compare Value of a Compare Column (or, if there is more than one Compare Column, a single Compare Value from each of the Compare Columns) and a corresponding Data Column element.

Output Vector: the data element of a Compare Row for which the Search Key is equal to the Compare Value (or, if there is more than one Compare Column, all keys are equal to the corresponding Compare Values). In some embodiments, the Output Vector may indicate an Action; in other embodiments the Output Vector is an interim comparison result.

Compare Circuit: a circuit for comparing one or more input Search Keys to one or more respective Compare Columns, and for outputting an Output Vector. In some embodiments, a Compare Circuit may comprise a TCAM.

Composite Search Key: a search key, comprising a header field (or a representation of a header field) and additional search data; in some embodiments, the output vector that is generated by a first Compare Circuit is the additional data of a Composite Search Key that is input to a second Compare Circuit.

Member-Group: The group of all unique key values in a Compare Column. For example, in column 204 (FIG. 2), K1 Member Group is the set {2, 3, 6, 31}, whereas K2 Member Group is the set {138.100.17.07, 138.100.17.09, 138.100.17.43, 138.100.17.63}.

Member ID: An ID number that is assigned to each element of a Member Group. In example embodiments, the smallest Member ID is zero, assigned to the smallest value of the relevant key; the next Member ID is 1, assigned to the next smallest key value, etc. For example, for K1 Member Group {2, 3, 6, 31}, Member ID numbers 0, 1, 2, 3 are assigned, respectively, to K1 values of 2, 3, 6, 31 (other one-to-one mappings may be used in alternative embodiments).

Vector Membership: when the ASC selects a given action in response to a given first Header Field value and any of a group of second Header Field values, the Member-IDs of the group of second Header Field value is referred to as a Vector Membership of the given first Header Field value.

One-Hot vector: a multi-element vector, having one set element, and having all other elements not set. In some embodiments, the non-set elements assume a logic-0 value.
Example Action Select Circuit Configurations and Associated Methods We will next proceed to describe two types of ASCs, according to embodiments of the present inventions—a Rule-with-Membership-Vector type, and a Vector-Membership type. In both types, the ASC comprises two interconnected Compare Circuits; the two types, however, have different compare circuit configurations and different interim search result structures.

Figure 3:
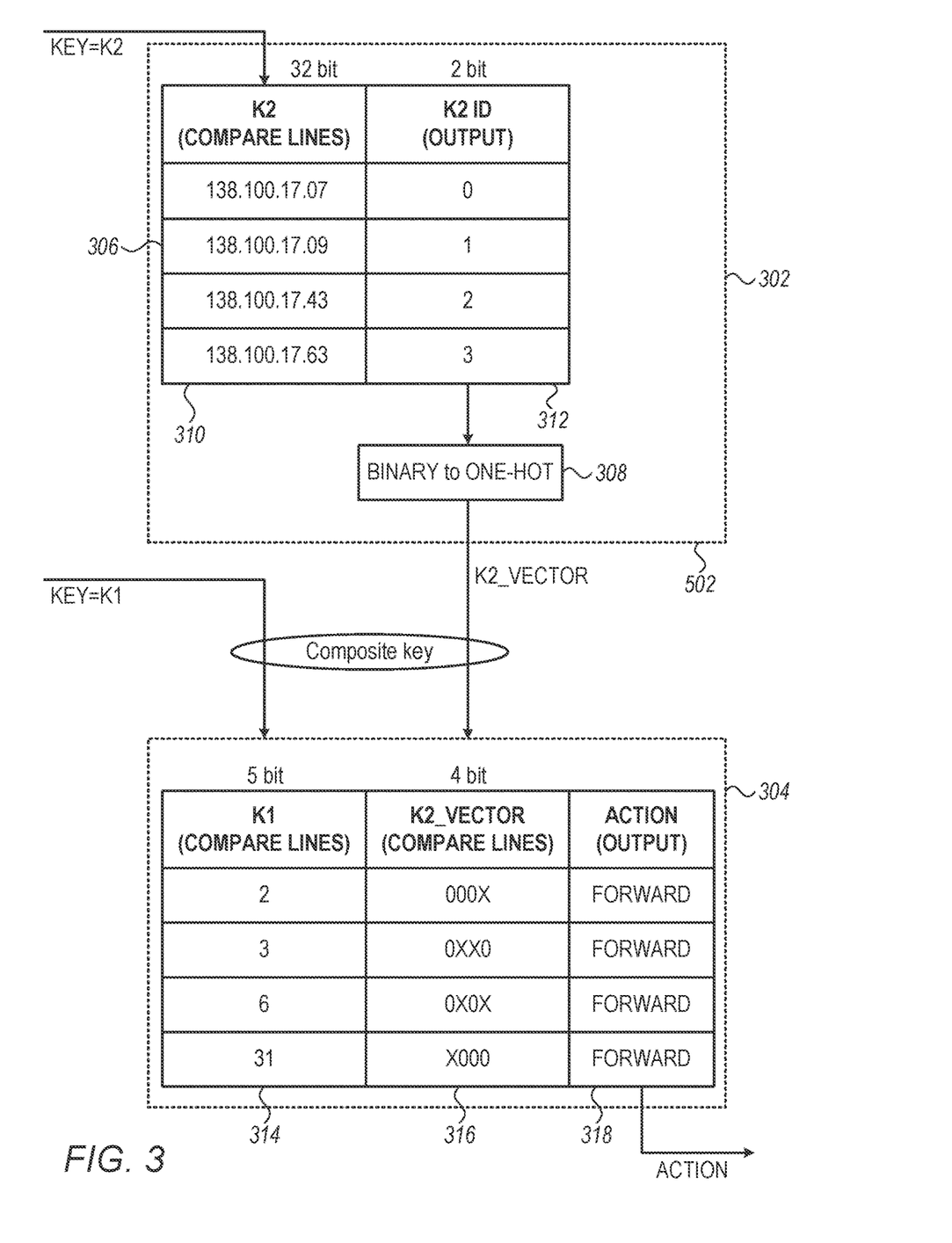
FIG. 3 is a block diagram that schematically illustrates a Rule-with-Membership-Vector type Action Select Circuit (ASC), in accordance with an embodiment of the present invention.

In embodiments, Search Columns may include "do not care" bits, that always match the respective input Search Key bits. In some embodiments (e.g., when the search circuit comprises a TCAM, or an algorithmic TCAM), more than one row of search values may match the input search keys; in embodiments, the Compare Circuit is configured to assign priority to data rules (e.g., according to the order of the rows) and, if more than two rows match, output the data corresponding to the highest priority rule.
Rule-with-Membership-Vector ASC FIG. 3 is a block diagram that schematically illustrates a Rule-with-Membership-Vector type ASC 300, in accordance with an embodiment of the present invention. ASC 300 comprises a First Compare Circuit 302 that receives a Search Key K2 corresponding to a destination-IP-address header field and outputs an interim search result One-Hot K2 vector, and a second Compare Circuit 304 that receives a Composite Search Key comprising a key K1 corresponding to a destination-port header field and the One-Hot K2 vector.

The first Compare Circuit 302 comprises a search circuitry 306 and a Binary-to-One-Hot Decoder 308. The Search circuitry compares a Search Key K2 (connected, for example, to the destination-IP-address Header-Field of the packet) to a Compare Column 310, and, responsively to a match, outputs a corresponding Data Column 312 value, comprising a K2-ID List, to the Binary-to-One-Hot Decoder 308, which then converts the K2 ID to a One-Hot K2_Vector interim search result.

The Second Compare Circuit 304 comprises a Compare Column K1 314 that stores compare values for K1 (e.g., the destination-port field of the packet header), a Compare Column 316 that stores compare values for the K2-Vector, and an Data Column 318, which stores the required packet action to be executed (e.g., by the packet processor) in case a match is found in the corresponding rows of both K1 column 314 and K2-vector column 316. Compare Column 316 stores a "do not care" value when an action is required (if the corresponding row in Compare Column 314 indicates a match) and a logic-0 where an action is not required. The concatenation of K1 and K2-vector is the Composite Search Key of the second Compare Circuit.

(According to the example embodiment, only a single action is indicated by ASC 300; hence, action column 318 is not needed—the second Compare Circuit will indicate Forward if there is a match in any Compare Row.)

The above description will be more fully understood if we examine, for example, the second row of the second Compare Circuit. According to the second row, a Forward action will be indicated if K1=3 and K2 vector matches the value of 0XX0 (that is—0 in bits 0 and 3, and either 0 or 1 in bits 1 and 2). Table 200 (FIG. 2) defines that, if K1=3 and K2 is either 138.100.17.09 or 138.100.17.43, the second Compare Circuit should indicate a Forward action.

We now look at the first compare circuit. If K2=138.100.17.09, K2 ID=1 (the second member, starting from 0), and K2 vector will read 0010 (second bit set); if K2=138.100.17.43, K2 ID=2 and K2 Vector=0100. In both cases bit 0 and bit 3 are at 0, and either bit 1 or bit 2 are at logic 1. In other words, if K1=3 and K is either 138.100.17.09 or 138.100.17.43, both the second row of K1 and the second row of K2 Vector will match, and the ASC will indicate a Forward action.

In embodiments, the total number of search cells in a Rule-with-Membership-Vector type action-select circuit 300 is:

$$N*Nw+M*(Mw+N)$$

and the number of data bits (e.g., K2 column 310) is:

$$N*\log N$$

where N is the number of K2 distinct values, Nw is the width of K2 entries (in bits), M is the number of K1 distinct values, and the log operations is base-2, rounded-up.

The configuration of Action-Select Circuit 300, illustrated in FIG. 3 and described hereinabove is an example that is cited merely for conceptual clarity. Other configurations may be used in alternative embodiments. For example, in some embodiments, more than two header fields are searched (for example, K1 to $K_n$); n−1 first Compare Circuits 302 output interim One-Hot search results vectors pertaining to header fields 2 through n, which are input to second Compare Circuit 304; the second Compare Circuit comprises, in addition to K1 Compare Column 314, n−1 Compare Columns to compare the vectors output from the n−1 first Compare Circuits.

In other embodiments, the Data Column of Compare Circuit 302 comprises One-Hot K2 vectors rather than K2 ID. This will make the data column wider (in the example illustrated in FIG. 3—four rather than two bits), but will eliminate the need for Binary-to-One-Hot circuit 308.

Figure 4A:
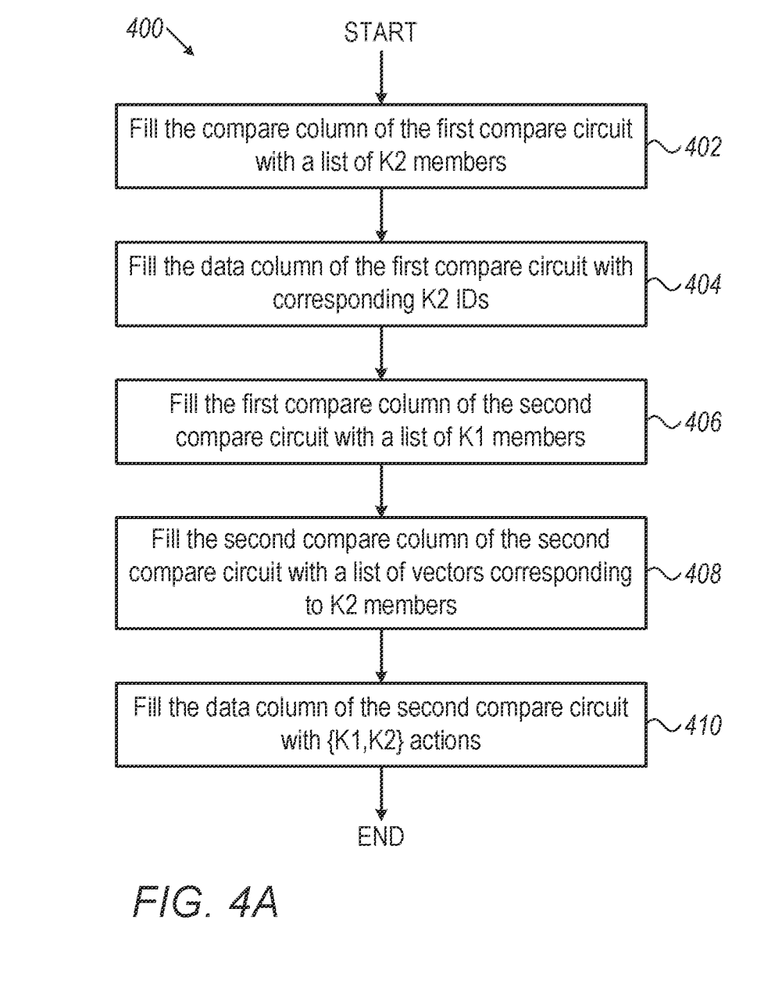
FIG. 4A is a flowchart that schematically illustrates a method for programming the Compare Circuits of a Rule-with-Membership-Vector type ASC, in accordance with an embodiment of the present invention.

FIG. 4A is a flowchart 400 that schematically illustrates a method for programming the Compare Circuits of a Rule-with-Membership-Vector type ASC, in accordance with an embodiment of the present invention. The flowchart is executed by processor 110 (FIG. 1). The method comprises programming of a first and a second Compare Circuits with compare values that correspond to a first and a second Header Fields (in current context, the first Header Field refers to the destination port whereas the second Header Field refers to the destination IP-address (other header fields may be used in alternative embodiments).

The flowchart starts at a Fill First Compare Circuit Search Column operation 402, wherein the processor fills the Compare Column of the first Compare Circuit with a list of compare values pertaining to Header Field values of the second Header Field. Next, the processor enters a Fill-First-Compare-Circuit-Data-Column operation 404, wherein the processor fills the Data Column of the first Compare Circuit with output vectors, comprising IDs of the corresponding values in the Compare Column (for example, the ID of a first unique compare value may 0, the ID of the second unique compare value may be 1, etc.). If there are N unique compare values in the Compare Column, the number of bits of each output vector will be $\log_2 N$, rounded up to the next integer (note that the size of the one-hot vector will be $2^N$).

At a Fill Second-Compare-Circuit-First-Compare-Column operation 406, the processor fills the first Compare Column of the second Compare Circuit with values of the first Header Field (in some embodiments, the compare values may include "do not care" values). Next, at a Fill Second-Compare-Circuit-Second-Search-Field operation 408, the processor fills the second Compare Column of the second Compare Circuit with rows that will include "do not care" elements in positions that match K2 members, and fills other elements with logic-0 (for example, in FIG. 3, row 2, as the combinations of K1=3 and either K2-ID=1 or K2-ID=2 result in a FORWARD action, the processor fills the second Search Field of the second Compare-Circuit with 0XX0).

Lastly, in a Fill Data Field Column operation 410, the processor fills the Data Column with actions that correspond to the combination of K1 and K2 in the matched Compare Row.

The configuration of flowchart 400, illustrated in FIG. 4A and described hereinabove is cited by way of example, for conceptual clarity. In alternative embodiments, the order of the operations may be different and/or some of the operations may be done concurrently. In some embodiments, when a new rule is added or an existing rule is removed, the setting of the ASC may be done incrementally, by modifying values in the various Compare and Data Columns.

Figure 4B:
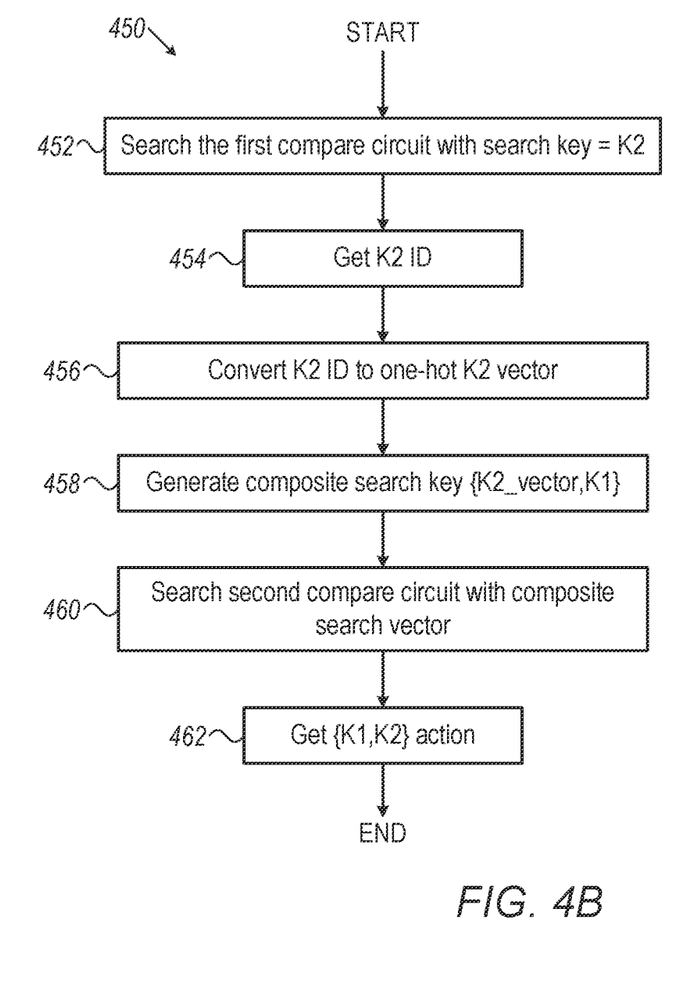
FIG. 4B is a flowchart that schematically illustrates a Rule-with-Membership-Vector method for determining an action, in accordance with an embodiment of the present invention.

FIG. 4B is a flowchart 450 that schematically illustrates a Rule-with-Membership-Vector method for determining an action, in accordance with an embodiment of the present invention. The flowchart is executed by ASC 106 (FIG. 1) and includes accessing of two Compare Circuits that where pre-set (e.g., according to flowchart 400, FIG. 4A).

The flowchart starts at an Access First Compare Circuit operation 452, wherein the ASC accesses the first Compare Circuit, using K2 (the contents of the second Header Field) as a Search Key. In some embodiments, a signature of the second Header Field is used as the Search Key.

Next, at a Get K2-ID operation 454, the ASC reads the ID of the matching K2 values from the first Compare Circuit. As explained above (with reference to FIG. 4A), the number of bits of the K2 ID is $\log_2 N$, where N is the number of unique search values in Search Column of the first Compare Circuit and $\log_2 N$ is rounded to the next higher integer.

The ASC next, at a Convert-to-One-Hot operation 456, converts K2 ID to a One-Hot vector, in which one bit is set (e.g., at logic-1), and all other bits are cleared (e.g., logic-0).

Next, at a Generate Composite Search Vector operation 458, the ASC concatenates the One-Hot K2 vector with K1—the contents of the f first Header Field (or, in an embodiment, a signature of the first Header Field), to generate a Composite Search Key; then, at an Access Second Compare Circuit operation 460 the ASC searches the second Compare Circuit, using the Composite Search Vector. Lastly, at a Get Action operation 462, the ASC reads the action which matches K1 and K2 from the second Compare Circuit.

The configuration of flowchart 450, illustrated in FIG. 4B and described hereinabove is an example configuration that is cited for the sake of conceptual clarity. Other configurations may be used in alternative embodiments. For example, in some embodiments, the first Compare Circuit does not include a binary to One-Hot decoder and, instead, the Data Column of the first Compare Circuit comprises decoded vector values (and, in this case, Search Circuit 306 is the only component of the first Compare Circuit 304, which can be discarded).

In other embodiments, other Header Fields may be used in the first and the second Compare Circuits; in an embodiment, the ASC gets, in operation 462, a coding of an action (e.g., "1" for Transfer, "0" for Drop). In other embodiments, the output of the second Compare Circuit may be coupled with outputs of other Compare Circuits, to generate the required action and, in yet other embodiments, the output of the second Compare Circuit may be used to generate another Composite Search Vector, to access more Compare Circuits.

Vector Membership ASC

Figure 5:
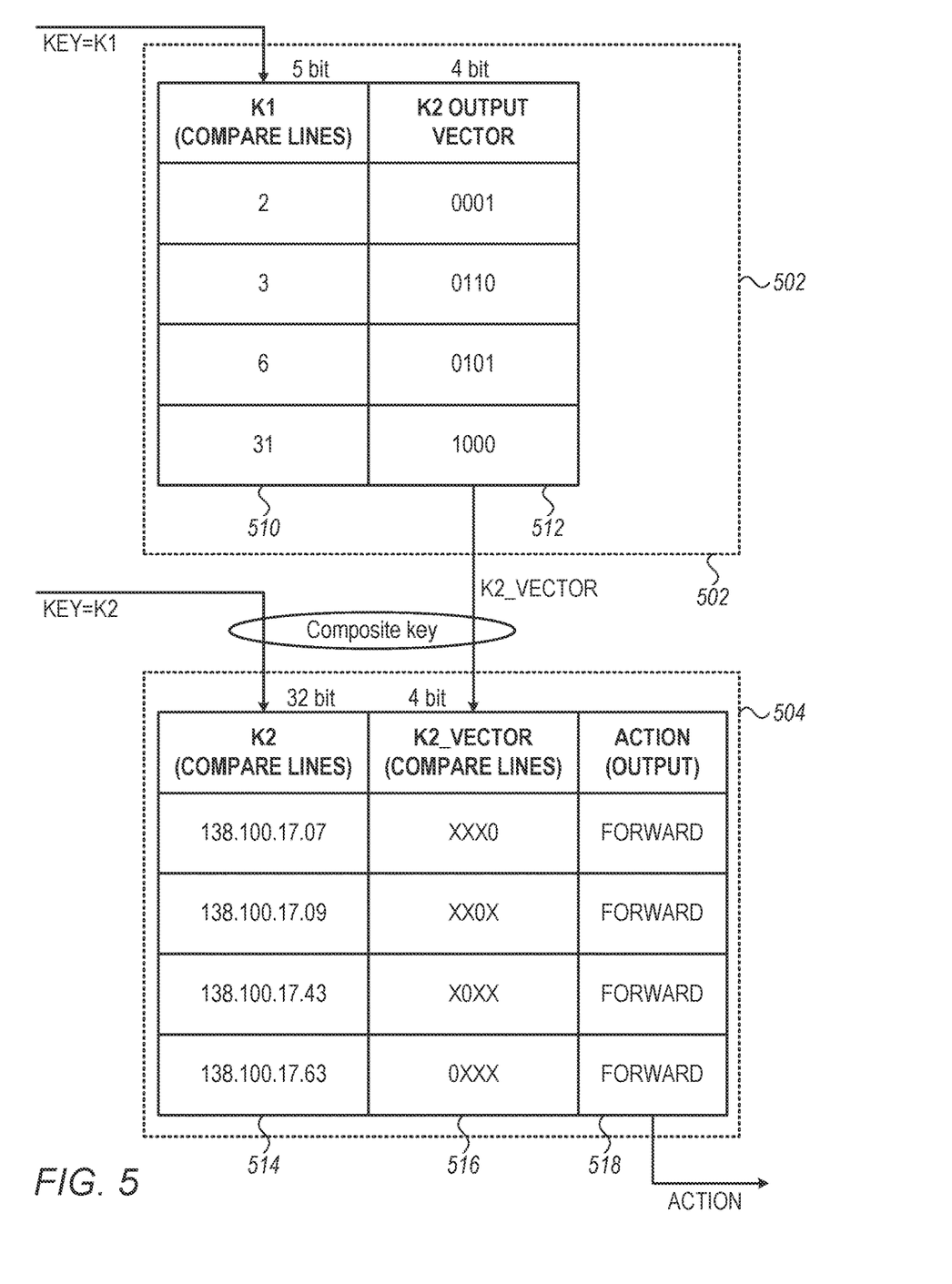
FIG. 5 is a block diagram that schematically illustrates a Vector-Membership type ASC, in accordance with an embodiment of the present invention.

FIG. 5 is a block diagram that schematically illustrates a Vector-Membership type ASC 500, in accordance with an embodiment of the present invention. ASC 500 comprises a First Compare Circuit 502 that receives a key K1 corresponding to a destination-port header field and outputs an interim search result K2 vector (also referred to as K2 vector membership), and a second Compare Circuit 504 that is accessed by a Composite Search Key and outputs an action.

The first Compare Circuit 502 compares a key K1 (connected, for example, to the destination-port field of the packet header) to a Compare Column 510, and, responsively to a match, outputs a corresponding Membership vector. The membership vector in a Compare-Row with a given K1 value in column 510 comprises set elements at locations that correspond to K2 values which, when combined with the given K1 values, will result in an action.

For example, (See FIG. 2), when the destination port in the first Header Field is 3, a Forward action is defined if the destination IP address is 138.100.17.09 or 138.100.17.43. The member ID for 138.100.17.09 is 1 (with One-Hot representation of 0010) and the member ID for 138.100.17.43 is 2, with One-Hot representation of 0100 (see member ID definition above). The membership vector that the first Compare Circuit outputs in response to destination port=3 is, therefore, 0010|0100=0110.

The Second Compare Circuit 504 is searched by the Composite Search Vector comprising the K2 input and the K2-membership vector that the first Compare Circuit outputs. Second Compare Circuit 504 comprises a Compare Column K2 514 that stores compare values for K2 (e.g., the destination-IP-address field of the packet header), a K2-Vector Search Column 516 that stores compare values for the K2-Vector, and an Action column 518, which stores the required packet action to be executed (e.g., by the packet processor) in case a match is found in the corresponding rows of both K1 column 514 and K2-vector column 516. (It should be noted that the function that the second table preforms is simple: It checks if the vector is set in the index=K2. In embodiments, a TCAM may be used for this bit extraction and comparison. The TCAM will comprise a small table when the number of K2 values is small.)

K2-Vector Compare Column 516 comprises One-Hot representations of the member ID of the corresponding K2 value in the K2 Compare Column, wherein non-set elements are at "do not care" value. For example, in the top Compare Row, the destination IP address is 138.100.17.07, which is the first member of the K2 group; the corresponding K2-vector column will be XXX0, where X stands for "do not care".

Like in ASC 300 embodiment (FIG. 3), ASC 500 can indicate only a single action type (Forward); hence, action column 518 is not needed—the second Compare Circuit will indicate Forward if there is a match in any Compare Row.

In embodiments, the total number of search cells in a Vector-Membership type action-select circuit 500 is:

$$M*Mw+N*(Nw+N)$$

and the number of data cells is M*B where N is the number of K2 rules, Nw is the width of K2 entries (in bits), and M is the number of K1 rules.

It should be noted that the assignment of the header fields to K1 and K2 is arbitrary. Other suitable assignments may be used in alternative embodiments.

The configuration of Action-Select Circuit 500, illustrated in FIG. 5 and described hereinabove is an example that is cited merely for conceptual clarity. Other configuration may be used in alternative embodiments. For example, in some embodiments, more than two Header Fields are searched (for example, $K_1$ to $K_n$); n−1 first Compare Circuits 502 output membership vectors that are combined and then concatenated with an nth key $K_n$ to create a Composite Search Key that is then input to an nth Compare Circuit.

Figure 6A:
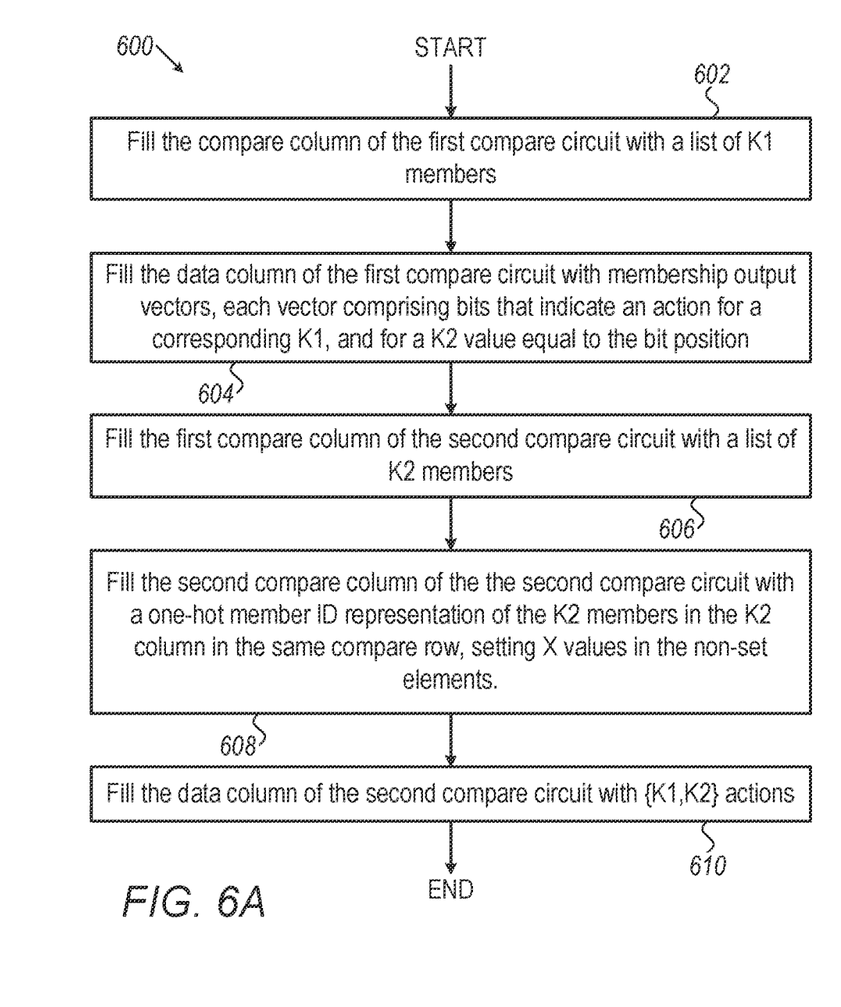
FIG. 6A is a flowchart that schematically illustrates a method for programming the Compare Circuits of a Vector-Membership type ASC, in accordance with an embodiment of the present invention.

FIG. 6A is a flowchart 600 that schematically illustrates a method for programming the Compare Circuits of a Vector-Membership type ASC, in accordance with an embodiment of the present invention. The flowchart is executed by processor 110 (FIG. 1). The method comprises programming of a first and a second Compare Circuits with compare values that correspond to a first and a second Header Fields (in current context, the first Header Field refers to the destination port whereas the second Header Field refers to the destination IP-address).

The flowchart starts at a Fill-First-Compare-Circuit-Compare-Column 602, wherein the processor fills the Compare column of the first Compare Circuit with a list of compare values pertaining to Header Field values of the first Header Field.

Next, the processor enters a Fill-First-Compare-Circuit-Data-Column operation 604, wherein the processor fills the data column of the first Compare Circuit with membership output vectors, wherein each element of the output vector is set if the ASC should apply an action to the packet when the first Header Field matches the corresponding K1 member in K1 Compare Column 510, and the second Header Field matches a K2 member respective to the element location in the Membership Vector.

The processor then enters a Fill-Second-Compare-Circuit-First-Compare-Column operation 606, and fills the Compare Column of the second Compare Circuit with a list of compare values pertaining to Header Field values of the second Header Field. Next, at a Fill-Second-Compare-Circuit-Second-Compare-Column operation 608, the processor fills the second Compare Column of the second Compare Circuit with a One-Hot member-ID representation of the K2 column, wherein non-set elements of the One-Hot vector are at "do not care" value. For example, if 138.110.17.07 is the first K2 member value, the corresponding One-Hot vector is XXX1; if the third member value is 138.110.17.43, the vector is X1XX.

Lastly, in a Fill-Second-Compare-Circuit-Data-Column operation 610, the processor fills the Data Column of the second Compare Circuit with the data to be applied to the packet, corresponding to the K1 and K2 values. In an embodiment, the action may be Forward only (or Drop, if a Forward action is not selected), and operation 610 may be skipped.

The configuration of flowchart 600, illustrated in FIG. 6A and described hereinabove is cited by way of example, for conceptual clarity. In alternative embodiments, the order of the operations may be different and/or some of the operations may be done concurrently. In some embodiments, when a new rule is added or an existing rule is removed, the setting of the ASC may be done incrementally, by modifying values in the various search and data columns.

Figure 6B:
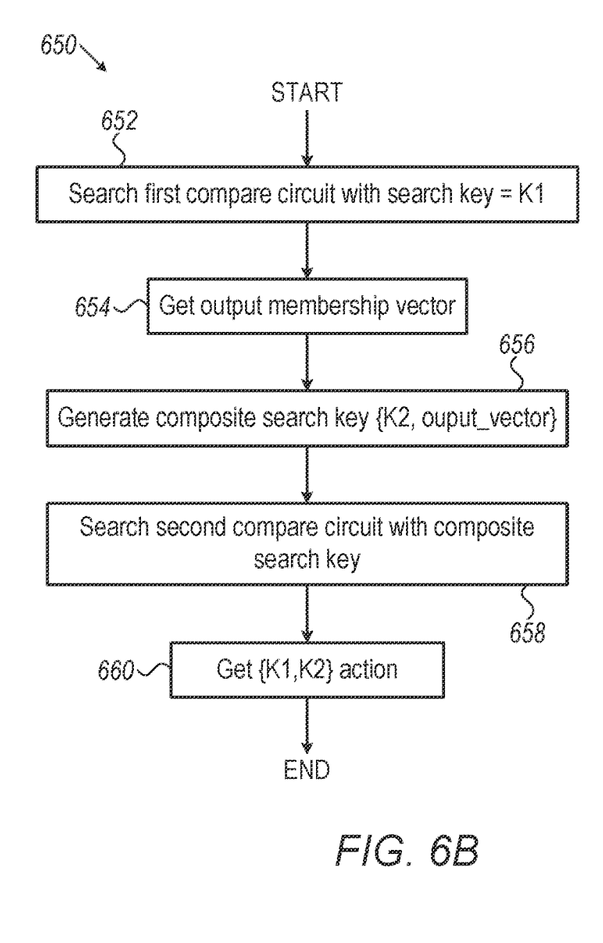
FIG. 6B is a flowchart that schematically illustrates a Vector-Membership method for determining an action, in accordance with an embodiment of the present invention.

FIG. 6B is a flowchart 650 that schematically illustrates a Vector-Membership method for determining an Action, in accordance with an embodiment of the present invention. The flowchart is executed by ASC 106 (FIG. 1) and includes searching in two Compare Circuits that where pre-set (e.g., according to flowchart 600, FIG. 6A).

The flowchart starts at a Search First Compare Circuit operation 652, wherein the ASC searches the first Compare Circuit, using K1 (the contents of the first Header Field) as a Compare Key. In some embodiments, a signature of the first Header Field is used as the Compare Key.

Next, at a Get Output-Membership-Vector operation 654, the ASC reads a membership vector, comprising a set bit for every K2 member that, when coinciding the with corresponding K1 value, will result in an Action.

The ASC next, at a Generate Composite Search Vector operation 656, concatenates the K2 Membership Vector with K2—the contents of the second Header Field (or, in an embodiment, a signature of the second Header Field). Next, at a Search Second Compare Circuit operation 658 the ASC searches the second Compare Circuit, using the Composite Search Vector. Lastly, at a Get Action operation 669, the ASC reads the action which corresponds to the header-fields combination {K1, K2}.

The configuration of flowchart 650, illustrated in FIG. 6B and described hereinabove is an example configuration that is cited for the sake of conceptual clarity. Other configurations may be used in alternative embodiments. For example, in some embodiments, other header fields may be used in the first and the second Compare Circuits; in an embodiment, the ASC gets, in operation 660, a coding of an action (e.g., "1" for Transfer, "0" for Drop). In other embodiments, the output of the second Compare Circuit may be coupled with outputs of other Compare Circuits, to generate the required action and, in yet other embodiments, the output of the second Compare Circuit may be used to generate another Composite Search Vector, to access more Compare Circuits.

Figure 7:
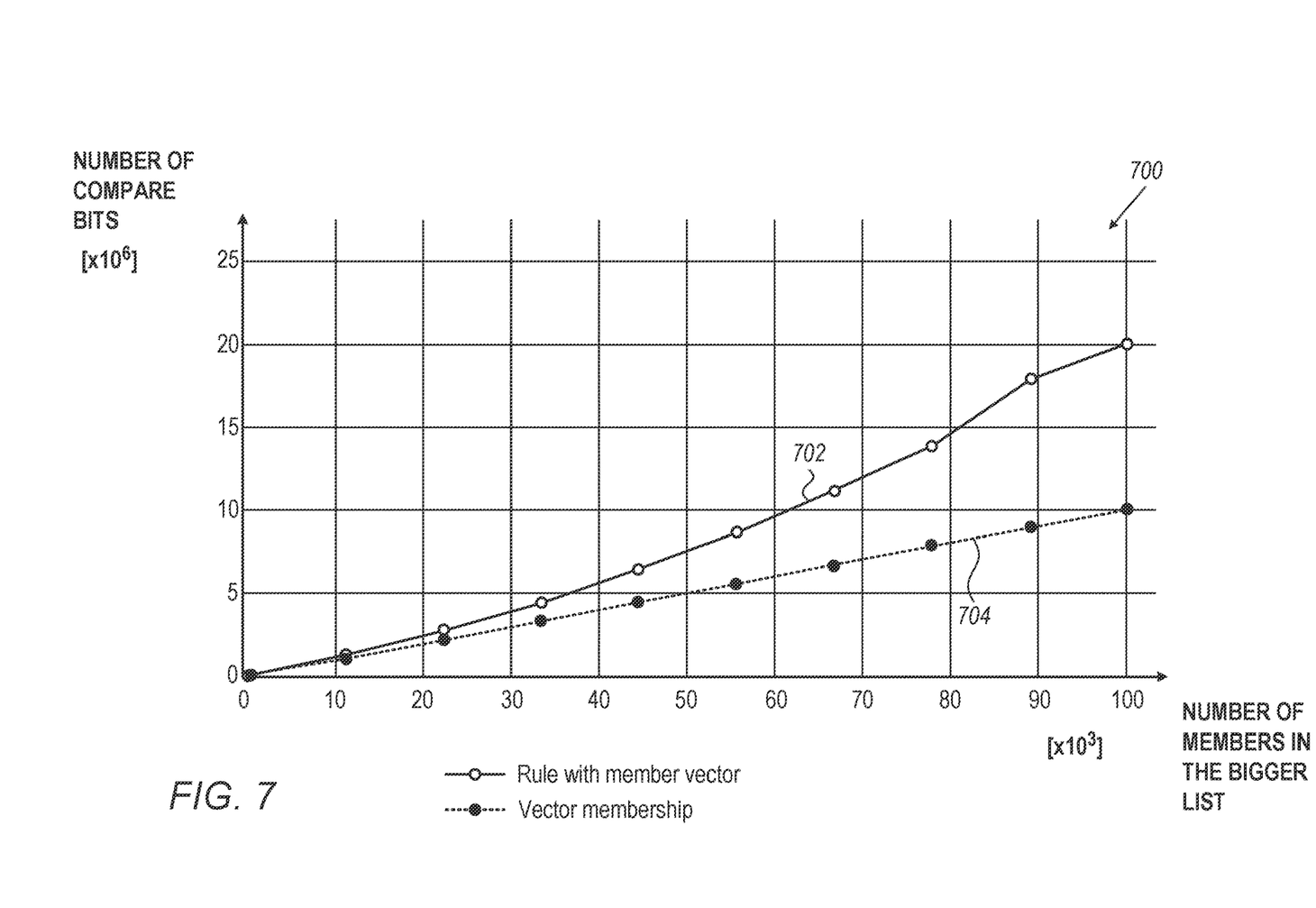
FIG. 7 is a graph that schematically illustrates the total number of compare bits required to select an action, in accordance with embodiments of the present invention.

FIG. 7 is a graph 700 that schematically illustrates the total number of compare bits required to select an action, in accordance with embodiments of the present invention. The graph comprises a plot 702, which shows the number of compare bits in a Rule-with-Membership-Vector type ASC, and a plot 704, indicating the number of compare bits, when the ASC is of a Membership-Vector type. In both plots, the number of members in the smaller header field is 0.1% of the number of members in the larger header field.

As can be seen, when the larger header field (e.g., destination IP address) comprises 100,000 members (and, hence, the smaller, e.g., the destination port ID, comprises 100,000*0.1%=100 members), the total number of compare bits in both the first and the second Compare Circuits is 10,000,000 for Vector Membership and 20,000,000 for Rule with Member-Vector ASCs, according to embodiments. These numbers should be compared with 100*100,000=100,000,000 compare bits needed for a full comparison of all combinations.

The configuration of Network device 100, including rules table 200, Rule-with-Membership-Vector type ASC 300, Membership-Vector type ASC 106, including the respective Compare Circuits 302, 304, 502, 504, the methods for Compare Circuits programming 400, 600, methods 450, 650, for determining an action according to header fields, are example configurations, table and methods that are shown purely for the sake of conceptual clarity. Any other suitable configurations, tables and methods can be used in alternative embodiments.

In various embodiments, the various action selection and/or group ID selection tasks described hereinabove may be carried out by hardware, by software, or by combination of hardware and software.

In various embodiments, the different circuits of network device 100, including the various ASCs and the various Compare Circuits, may be implemented using suitable hardware, such as one or more Application-Specific Integrated Circuits (ASIC) or Field-Programmable Gate Arrays (FPGA), or a combination of ASIC and FPGA.

Processor 110 and Packet Processor 108 typically comprise one or more general-purpose processors, which are programmed in software to carry out the packet processing functions. The software may be downloaded to the processor in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
 one or more ports, to exchange packets over a network, each packet comprising a packet header having at least first and second header fields;
 action-select circuitry, to:
  for a given packet, determine a first search key based on the first header field of the given packet, and a second search key based on the second header field of the given packet;

compare the first search key to a first group of compare values, and, responsively to a match between the first search key and a first compare value in the first group, output a multi-element vector comprising multiple elements, each element of the multi-element vector being (i) set, if a corresponding second compare value in a second group of compare values matches the second search key, and (ii) not set, if the corresponding second compare value in the second group does not match the second search key;

generate a composite search key, by concatenating the second search key and the multi-element vector; and compare the composite search key to a second group of compare values, and, responsively to a match between the composite search key and a second compare value in the second group, output an action indicator for applying to the given packet; and a packet processor, to process the packets responsively to the packet headers, including applying an action to the given packet responsively to the action indicator, which was output by the compare circuitry.

2. The network device according to claim 1, wherein the compare values in the second group comprise (i) second search key values, and (ii) multi-element vector compare values in which one or more elements, in positions indicative of indices of a first search key value, are set, and elements in other positions are set to a "do not care" value.

3. The network device according to claim 1, wherein at least one of the first and second compare values comprises a "do not care" value.

4. The network device according to claim 1, wherein the multi-element vector comprises binary elements.

5. The network device according to claim 1, wherein the action-select circuitry comprises a Ternary Content Addressable Memory (TCAM), to store one or both of the first and second groups of compare values.

6. A method in a network device, the method comprising:
exchanging packets over a network, each packet comprising a packet header having at least first and second header fields;

for a given packet, determining a first search key based on the first header field of the given packet, and a second search key based on the second header field of the given packet;

comparing the first search key to a first group of compare values, and, responsively to a match between the first search key and a first compare value in the first group, outputting a multi-element vector comprising multiple elements, each element of the multi-element vector being (i) set, if a corresponding second compare value in a second group of compare values matches the second search key, and (ii) not set, if the corresponding second compare value in the second group does not match the second search key;

generating a composite search key, by concatenating the first search key and the multi-element vector;

comparing the composite search key to a second group of compare values, and, responsively to a match between the composite search key and a second compare value in the second group, outputting an action indicator for applying to the given packet; and processing the packets responsively to the packet headers, including applying an action to the given packet responsively to the action indicator, which was output by the compare circuitry.

7. The method according to claim 6, wherein the compare values in the second group comprise (i) second search key values, and (ii) multi-element vector compare values in which one or more elements, in positions indicative of indices of a first search key value, are set, and elements in other positions are set to a "do not care" value.

8. The method according to claim 6, wherein at least one of the first and second compare values comprises a "do not care" value.

9. The method according to claim 6, wherein the multi-element vector comprises binary elements.

10. The method according to claim 6, and comprising storing one or both of the first and second groups of compare values in a Ternary Content Addressable Memory (TCAM).

11. A method for determining actions to be applied to packets in a network device, the method comprising:
for a given packet being processed in the network device, determining a first search key based on a first header field of the given packet, and a second search key based on a second header field of the given packet;

comparing the first search key to a first group of compare values, and, responsively to a match, outputting a multi-element vector comprising multiple elements, each element of the multi-element vector being (i) set, if a corresponding second compare value in a second group of compare values matches the second search key, and (ii) not set, if the corresponding second compare value in the second group does not match the second search key;

generating a composite search key, by concatenating the first search key and the multi-element vector; and comparing the composite search key to a second group of compare values, and, responsively to a match, outputting an action indicator for applying to the given packet.

* * * * *